(12) United States Patent  
Barbulescu

(10) Patent No.: US 6,734,384 B2
(45) Date of Patent: May 11, 2004

(54) ELECTRICAL DISCHARGE MACHINE APPARATUS WITH IMPROVED DIELECTRIC FLUSHING

(75) Inventor: George Barbulescu, Ann Arbor, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 0 days.

(21) Appl. No.: 10/216,264

(22) Filed: Aug. 10, 2002

(65) Prior Publication Data

US 2003/0029843 A1 Feb. 13, 2003

Related U.S. Application Data

(60) Provisional application No. 60/311,777, filed on Aug. 10, 2001.

(51) Int. Cl.[7] .................................................. B23H 1/10
(52) U.S. Cl. ..................................... 219/69.14; 219/69.2
(58) Field of Search ........................... 219/69.12, 69.14, 219/69.2

(56) References Cited

U.S. PATENT DOCUMENTS 3,939,321 A * 2/1976 Bertrand et al.
4,578,556 A * 3/1986 Inoue ......................... 219/69.14
4,980,036 A * 12/1990 Saito et al. ................. 219/69.14
5,159,167 A * 10/1992 Chaikin et al. ............. 219/69.2
5,908,563 A    6/1999 Barbulescu
5,951,883 A    9/1999 Barbulescu
6,344,624 B1 * 2/2002 Moro et al. ................ 219/69.12

FOREIGN PATENT DOCUMENTS

| JP | 55-83528 A | * | 6/1980 | ............ 219/69.12 |
| JP | 1-310820 A | * | 12/1989 | ............ 219/69.12 |
| JP | 2000-225523 A | * | 8/2000 | |
| WO | WO-00/23220 A | * | 4/2000 | |

* cited by examiner

*Primary Examiner*—Geoffrey S. Evans
(74) *Attorney, Agent, or Firm*—Brinks Hofer Gilson & Lione

(57) ABSTRACT

An electrical discharge machining system for machining a workpiece. The system comprises a wire guide support for positioning and guiding a wire electrode into a desired position relative to the workpiece and a source of a liquid dielectric fluid. The supply also provides means for directing the dielectric fluid from the source to a machining site between the electrode and the workpiece, and for atomizing the dielectric fluid in the machining site.

7 Claims, 4 Drawing Sheets

US 6,734,384 B2

ELECTRICAL DISCHARGE MACHINE APPARATUS WITH IMPROVED DIELECTRIC FLUSHING

This application claims the benefit of provisional application No. 60/311,777 filed Aug. 10, 2001.

BACKGROUND OF THE INVENTION

This invention is related to a machining process and particularly to an electrical discharge machining (EDM) technique and tooling.

BACKGROUND AND SUMMARY OF THE INVENTION

EDM is a well-known and widely used machining technique. It operates through the erosion of a workpiece, generally metallic, through electrical discharges from an electrode. The process takes place in the presence of a liquid dielectric fluid, such as de-ionized water. An electrode in the shape of an elongated rod, thin wire, or shaped article is put into close contact with the workpiece. Through an electrical potential difference, arcing occurs between the workpiece and the electrode which causes erosion of the workpiece material in a desired manner.

EDM processes are used in numerous machining applications. It is especially desirable for its high forming accuracy, ability to machine extremely hard workpieces, low applied loading of the workpiece, and for deep bores in workpieces.

There are various machining projects which pose difficulties in using EDM processes. For example, due to the workpiece configuration, it may be difficult to provide a continuous stream of dielectric fluid at the machining site. An absence of the fluid interrupts the EDM process. This problem may arise in numerous instances. For example, in a case where a small counter bore is to be formed, a larger bore of a limited depth in the workpiece is generally first formed. Thereafter, when it is desired to continue the bore at a smaller diameter, it may be difficult to provide a flow of dielectric fluid at the machining site. In a more specific example, in the machining of internal combustion engine fuel injection nozzles, it may be desirable to provide a stepped bore of this nature. A dielectric fluid stream flowing over the surface of the nozzle may not properly flow into the machining gap. The EDM tools and techniques in accordance with this invention are intended to address this difficulty.

In accordance with the teachings of this invention, several embodiments of alternate means for directing the flow of dielectric fluid are described. In one embodiment, an air stream jet is directed at an angle from the direction of dielectric fluid flow which disperses the dielectric fluid and forces it into the machining gap. In a second embodiment, the dielectric fluid is atomized with air and the mixture is thereafter sprayed into the machining gap. In a third embodiment, an ultrasonic generator is used to disperse the dielectric fluid which more readily flows into the machining gap.

Additional benefits and advantages of the present invention will become apparent to those skilled in the art to which the present invention relates from the subsequent description of the preferred embodiment and the appended claims, taken in conjunction with the accompanying drawings.

DETAILED DESCRIPTION OF THE INVENTION

Figure 1:
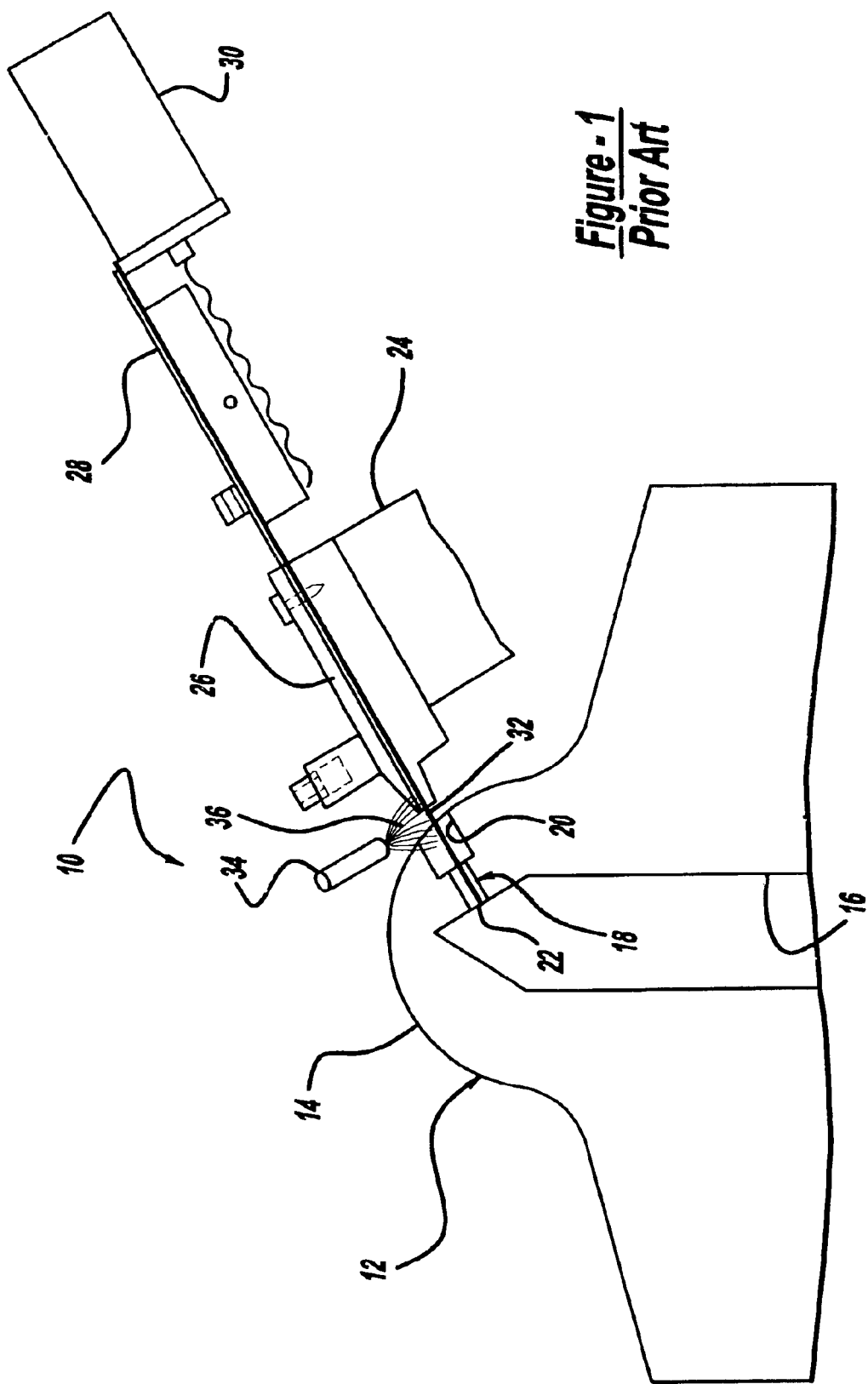
FIG. 1 is a pictorial representation of an EDM system with a representative workpiece in accordance with the prior art.

FIG. 1 illustrates an EDM system in accordance with the prior art which is generally designated by reference number 10. EDM system 10 is shown forming a counter bore in a representative workpiece 12 which is the injection tip of a fuel injection nozzle of the type used in certain internal combustion engines, such as diesel engines. As shown, workpiece 12 has a rounded tip 14 and an internal fuel flow passageway 16. As compared with other elements shown in this figure, as well as the remaining figures of this specification, workpiece 12 is shown in an exaggerated large scale. Passageway 16 may be formed by various machining techniques. Injection orifice 18 is however, formed through EDM processes. Injection orifice 18 includes an enlarged counter bore 20 and a reduced diameter passageway 22. In a representative workpiece 12, counter bore 20 would have a diameter in the range of 0.020 to 0.060 inches. Whereas passageway 22 has a diameter ranging from 0.005 to 0.010 inches.

The EDM system 10 further includes conventional elements for EDM machining including wire guide support 24 which provides a mounting surface for wire guide assembly 26. The electrode 32 in the form of an elongated wire is also electrically connected with EDM servo micro slide 28. EDM servomotor 30 actuates the micro slide 28 to position the terminal tip of electrode 32 in the machining area.

The electrode 32 may be formed of various materials conventionally used in EDM machining, including brass, tungsten, copper, graphite, and alloys or mixtures thereof and a host of other materials. In a preferred embodiment, counter bore 20 would be formed of a brass electrode whereas passageway 22 would be formed by a tungsten electrode.

During the EDM process, EDM servomotor 30 positions the end of electrode 32 in the machining area. Feedback controls are used to properly position the electrode tip. The electrode is electrically charged and an arc is formed between the electrode and workpiece which causes erosion of the workpiece in a desired controlled manner.

In order to support the EDM process, a liquid dielectric flushing fluid is used. A commonly used material is de-ionized water which is directed through dielectric flushing nozzle 34. A stream of dielectric fluid 36 is shown flowing across the outer surface of workpiece rounded tip 14.

FIG. 1 illustrates conventional elements of an EDM process. Unfortunately, the system as shown in FIG. 1 when operated in accordance with the prior art does not provide an acceptable EDM process for a production environment for workpiece 12. An electrode sized to form counter bore 20 is loaded into the EDM system and machining occurs in the presence of a flow of dielectric fluid 36. Little difficulty is encountered in forming counter bore 20. However, following formation of counter bore 20, great difficulty is encountered in forming passageway 22 by EDM. Due to the small diameter of passageway 22, and its recessed location, it is difficult to maintain a constant flow of dielectric fluid 36 at the machining zone. Without the presence of dielectric fluid, the machining operation is interrupted. In addition, debris generated by the EDM erosion process is not properly removed from the machining area when dielectric fluid flow is interrupted. These problems give rise to a slow machining rate, lack of precision of the formed features, and an interruption of the EDM process.

Figure 2:
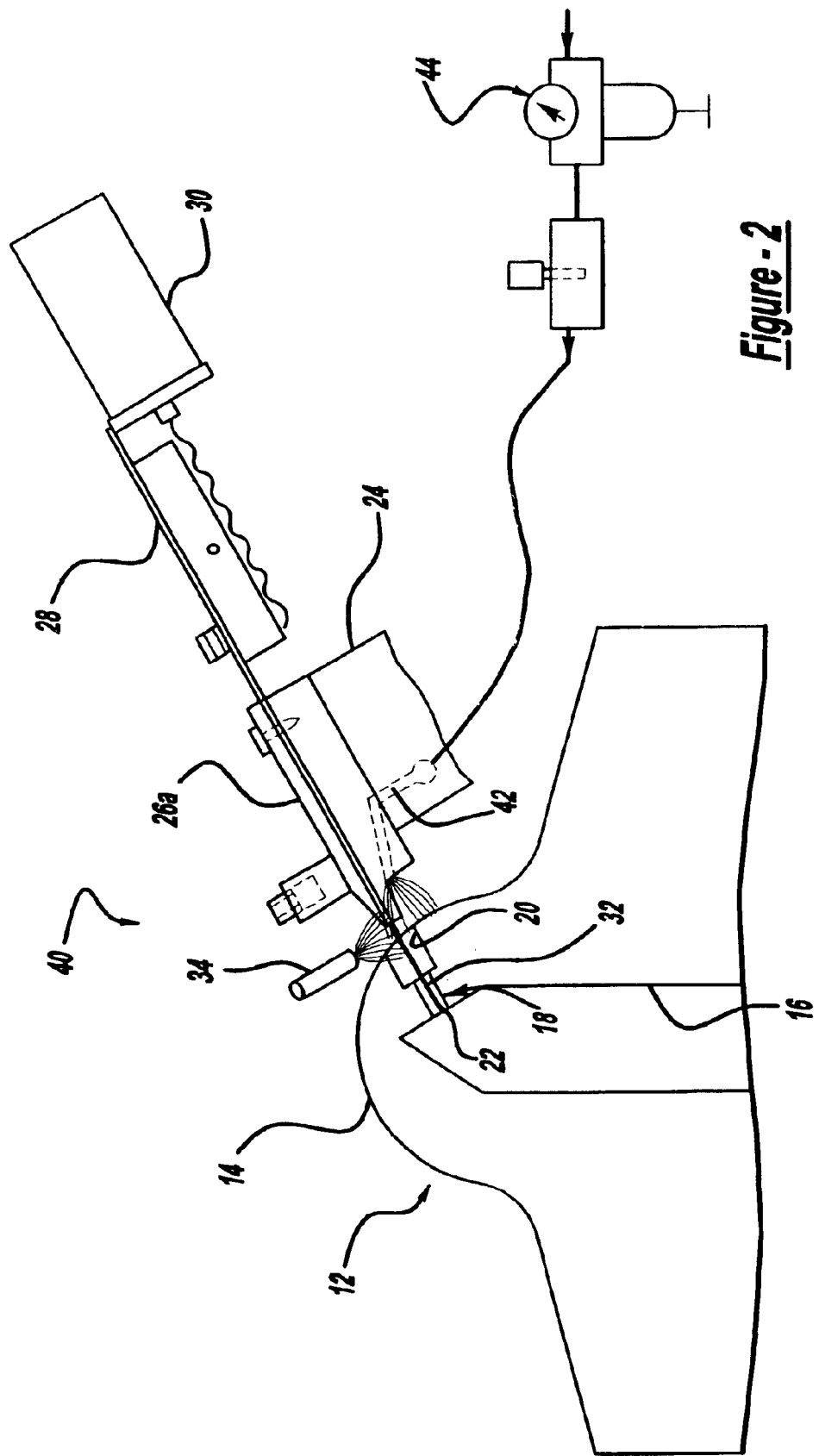
FIG. 2 is a pictorial representation of an EDM system in accordance with a first embodiment of the invention utilizing an airflow channel through the wire guide assembly.
Figure 3:
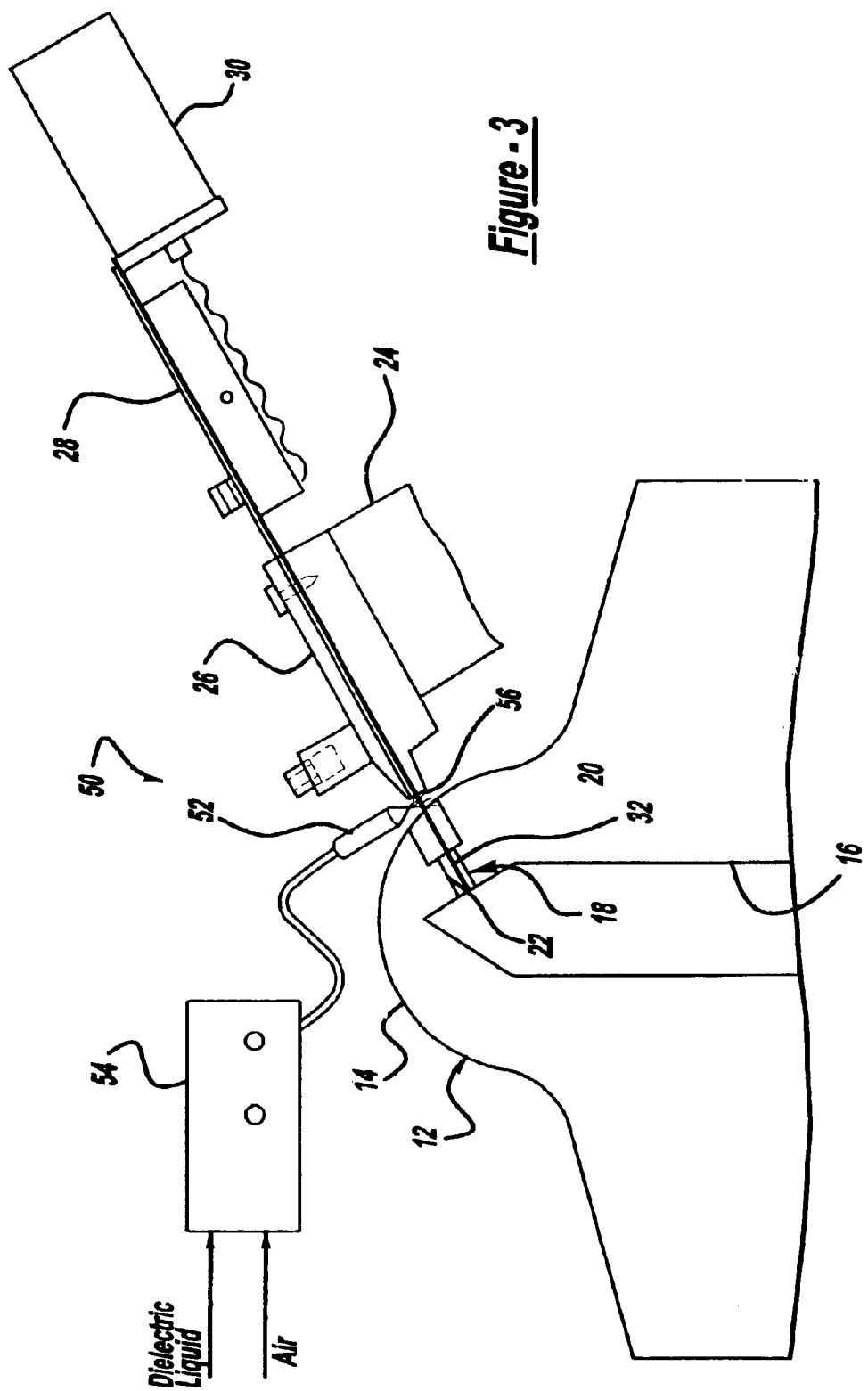
FIG. 3 is a pictorial representation of an EDM system in accordance with a second embodiment of the invention shown with an atomized flushing fluid.
Figure 4:
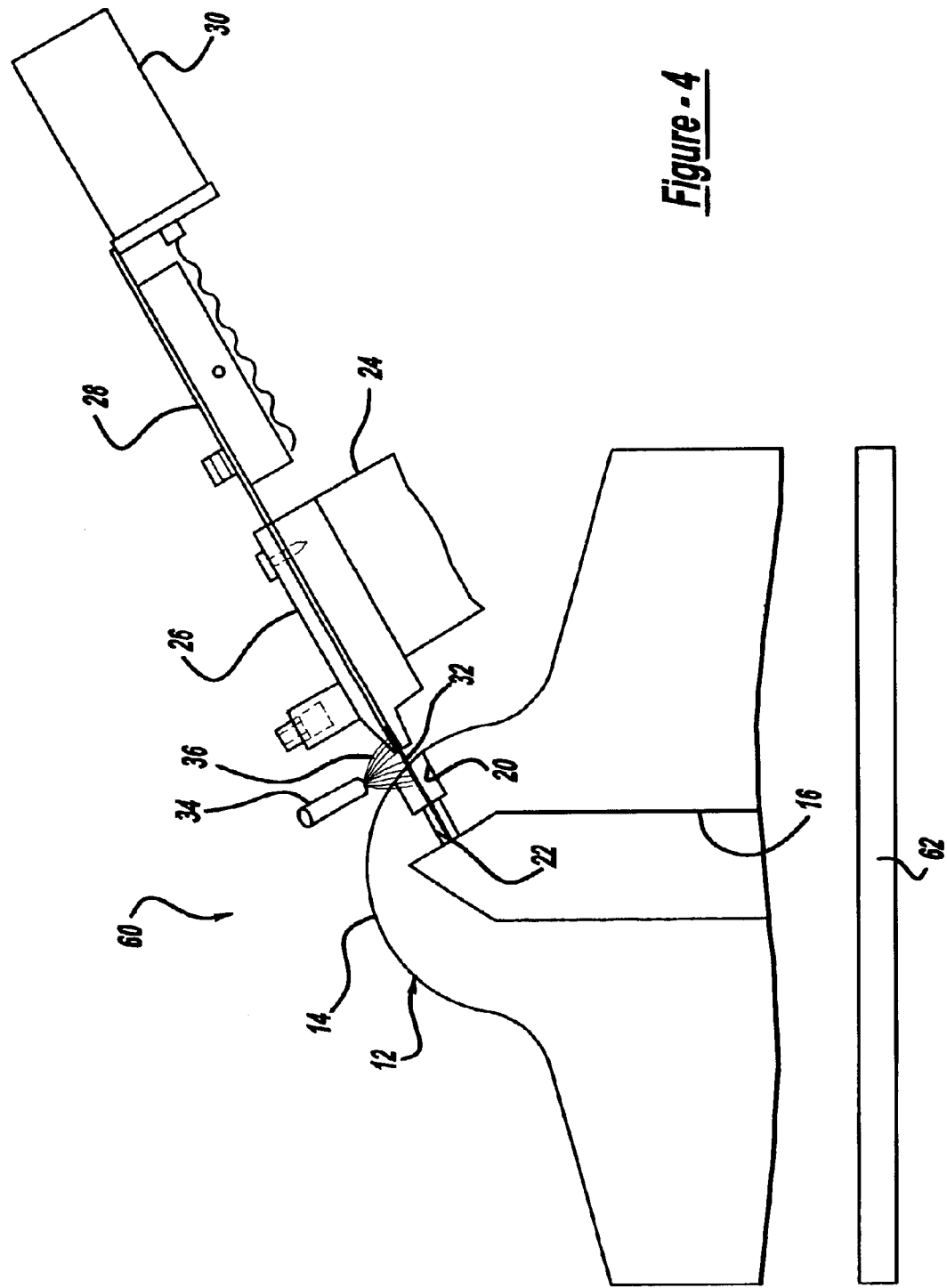
FIG. 4 is a pictorial representation of an EDM system in accordance with a fourth embodiment of the invention utilizing an ultrasonic actuator coupled with the workpiece.

FIGS. 2 through 4 illustrate various embodiments of improved EDM systems in accordance with this invention which overcome the problems encountered with the system illustrated in FIG. 1. In each of FIGS. 1 through 4, elements are shown which are common with those described and shown in FIG. 1 and are identified by like reference numbers.

FIG. 2 illustrates EDM system 40 in accordance with a first embodiment of this invention. For this embodiment, numerous elements are common with those shown in FIG. 1. However, EDM system 40 varies from EDM system 10 in that an auxiliary airflow passageway 42 is formed through wire guide assembly 26a. Airflow passageway 42 directs a stream of air provided by flow control source 44. Preferably, air is supplied to passageway 42 at a pressure of about 7 psi. Airflow passageway 42 is directed to orient the flow of air escaping wire guide assembly 26a directly at the machining area.

The addition of airflow passageway 42 and flow control source 44 creates airflow in the direction of the machining zone. Therefore, dielectric fluid 36 flowing across the outside surface of rounded tip 14 is forced into counter bore 20 and passageway 22 to interact with the electrode in that area to support proper EDM machining action. Thus EDM system 40 provides a flow of dielectric fluid 36 oriented to flow in a direction generally perpendicular to the longitudinal axis of electrode 32, whereas the flow of air from passageway 42 is generally aligned with the axis of electrode 32. With this arrangement, dielectric fluid 36 flows across the bore 20 and passageway 22 and the airflow pushes the fluid into the machining site.

Now with reference to FIG. 3, a second embodiment of an EDM system 50 is illustrated. Again, numerous elements are common with those shown in FIG. 1. In this case, however, dielectric nozzle 34 is replaced by atomized mixture nozzle 52. Upstream of nozzle 52, a flow of dielectric liquid and air combine in mixing chamber 54. This spray 56 of atomized air and dielectric fluid is directed at the electrode 32. Due to the atomization of the dielectric fluid in accordance with EDM system 50, the mixture is able to more easily flow into the narrow gaps and flow areas to thereby support proper EDM action.

EDM system 60 in accordance with a fourth embodiment of the invention is illustrated in FIG. 4. EDM machining system 60 is substantially identical to the prior art structure illustrated in FIG. 1 with the exception of the addition of ultrasonic actuator 62. Ultrasonic actuator 62 causes a high frequency vibration to occur within workpiece 12. This vibration serves to agitate and atomize the flow of dielectric fluid 36 flowing from nozzle 34. The agitation and atomization of the flow caused by the vibration of workpiece 12, servers in a manner like the prior embodiments to atomize and agitate the dielectric material and force it into the machining site.

While the above description constitutes the preferred embodiment of the present invention, it will be appreciated that the invention is susceptible to modification, variation and change without departing from the proper scope and fair meaning of the accompanying claims.

What is claimed is:

1. An electrical discharge machining system for machining a workpiece comprising:

a wire guide support for positioning and guiding a wire electrode into a desired position relative to the workpiece;

a source of a liquid dielectric fluid; and supply means for directing the dielectric fluid from the source to a machining site between the electrode and the workpiece and for atomizing the dielectric fluid in the machining site; wherein the supply means includes mixing chamber having inlets for the dielectric fluid and for pressurized air from a source of pressurized air and the mixing chamber mixing the dielectric fluid and the pressurized air to atomize the dielectric fluid and having a nozzle independent from the wire guide support for directing the atomized dielectric fluid to the maching site.

2. An electrical discharge machining system for machining a workpiece comprising:

a wire guide support for positioning and guiding a wire electrode into a desired position relative to the workpiece;

a source of a liquid dielectric fluid;

a nozzle for supplying the dielectric fluid in the form of a liquid from the source to a machining site between the electrode and the workpiece;

a source of pressurized air for creating a stream of air;

a passageway for directing the stream of air; and the nozzle and the passageway oriented to cause the dielectric fluid and the stream of air to interact to cause atomization of the dielectric fluid in the machining site.

3. An electrical discharge machining according to claim 2 wherein the nozzle directs the dielectric fluid to flow in a direction generally perpendicular to the longitudinal axis of the electrode and the stream of air flows in a direction generally aligned with the longitudinal axis of the electrode.

4. An electrical discharge machining system for machining a workpiece comprising:

a wire guide support for positioning and guiding a wire electrode into a desired position relative to the workpiece;

a source of a liquid dielectric fluid;

a source of pressurized air;

a mixing chamber having inlets for the dielectric fluid and the pressurized air and mixing the dielectric fluid and the air to atomize the dielectric fluid; and a nozzle independent from the wire guide support for receiving the atomized dielectric fluid from the mixing chamber and directing the atomized dielectric fluid to the machining site.

5. An electrical discharge machining system for machining a workpiece comprising:

a wire guide support for positioning and guiding a wire electrode into a desired position relative to the workpiece;

a source of a liquid dielectric fluid;

supply means for directing the dielectric fluid from the source to a machining site between the electrode and the workpiece, and an ultrasonic generator coupled with the workpiece for causing ultrasonic vibrations in the workpiece to thereby agitate and atomize the dielectric fluid at the machining site.

6. An electrical discharge machining system for machining a workplece comprising:

a wire guide support for positioning and guiding a wire electrode into a desired position relative to the workpiece;

a source of a liquid dielectric fluid; and supply means for directing the dielectric fluid from the source to a machining site between the electrode and the workpiece and for atomizing the dielectric fluid in the machining site wherein the supply means comprises a nozzle for supplying the dielectric fluid in the form of a liquid and a source of pressurized air and an air flow passageway for creating a stream of air and wherein the dielectric fluid and the stream of air interact to cause the atomizing of the dielectric fluid.

7. An electrical discharge machining according to claim 6 wherein the nozzle directs the dielectric fluid to flow in a direction generally perpendicular to the longitudinal axis of the electrode and the stream of air flows in a direction generally aligned with the longitudinal axis of the electrode.

* * * * *

UNITED STATES PATENT AND TRADEMARK OFFICE
CERTIFICATE OF CORRECTION

PATENT NO. : 6,734,384 B2
DATED : May 11, 2004
INVENTOR(S) : George Barbulescu

It is certified that error appears in the above-identified patent and that said Letters Patent is hereby corrected as shown below:

<u>Column 5,</u>
Line 6, after "a" delete "workplece" and insert -- workpiece --.

Signed and Sealed this

Twenty-first Day of December, 2004

JON W. DUDAS
*Director of the United States Patent and Trademark Office*